(12) United States Patent
Schoettl

(10) Patent No.: US 8,538,600 B2
(45) Date of Patent: Sep. 17, 2013

(54) METHOD FOR PROVIDING CONTROL COMMANDS FOR A VEHICLE STEERABLE BY MEANS OF AN OPERATING UNIT AND CONTROL SYSTEM FOR A STEERABLE VEHICLE OF THIS TYPE

(75) Inventor: Alfred Schoettl, Munich (DE)

(73) Assignee: LFK-Lenkflugkoerpersysteme GmbH, Schrobenhausen (DE)

( * ) Notice: Subject to any disclaimer, the term of this patent is extended or adjusted under 35 U.S.C. 154(b) by 578 days.

(21) Appl. No.: 12/877,570

(22) Filed: Sep. 8, 2010

(65) Prior Publication Data
US 2011/0071703 A1 Mar. 24, 2011

(30) Foreign Application Priority Data
Sep. 18, 2009 (DE) .......................... 10 2009 042 172

(51) Int. Cl.
*G05D 1/00* (2006.01)
*F42B 15/01* (2006.01)

(52) U.S. Cl.
USPC .................. 701/2; 244/3.1; 348/114; 342/62; 345/420

(58) Field of Classification Search
USPC ............... 701/2; 244/3.1; 348/114; 342/62; 345/420
See application file for complete search history.

(56) References Cited

U.S. PATENT DOCUMENTS
4,855,822 A 8/1989 Narendra et al.
2008/0136923 A1 6/2008 Inbar et al.

OTHER PUBLICATIONS

German Office Action in counterpart application DE 10 2009 042 172, dated Apr. 16, 2010 along with a partial English-language translation thereof.

*Primary Examiner* — Thomas Black
*Assistant Examiner* — War Louie
(74) *Attorney, Agent, or Firm* — Greenblum & Bernstein, P.L.C.

(57) ABSTRACT

Method and control system for providing control commands for a vehicle steerable by an operating unit or for an image acquisition device of the vehicle by sequential display of acquired image data on an image display device of the operating unit connected to the vehicle via a data transfer connection. The method includes acquiring data of an image recorded by the image acquisition device, acquiring vehicle state data at a time the image was recorded, and compressing the image data. The method also includes transferring the compressed image data and the vehicle state data via the data transfer connection to the operating unit, decompressing the transferred image data to form a displayable image, and displaying the displayable image on the image display device. The method further includes entering an operator command into the operating unit to at least one of change a direction of movement of the vehicle and change a direction of view of the image acquisition device, calculating a new image from the displayable image that takes into account the transferred vehicle state data and the entered operator command, displaying the new image on the image display device instead of the displayable image, and transferring a control command from the operator command to the vehicle via the data transfer connection.

17 Claims, 4 Drawing Sheets

METHOD FOR PROVIDING CONTROL COMMANDS FOR A VEHICLE STEERABLE BY MEANS OF AN OPERATING UNIT AND CONTROL SYSTEM FOR A STEERABLE VEHICLE OF THIS TYPE

CROSS-REFERENCE TO RELATED APPLICATIONS

The present application claims priority under 35 U.S.C. §119 of German Patent Application No. 10 2009 042 172, filed on Sep. 18, 2009, the disclosure of which is expressly incorporated by reference herein in its entirety.

BACKGROUND OF THE INVENTION

1. Field of the Invention

The present invention relates to a method for providing control commands for a vehicle steerable by an operating unit or for an image acquisition device of the vehicle by sequential display of image data of the image acquisition device of the vehicle on an image display device of the operating device connected to the vehicle via a data transfer connection. It furthermore relates to a control system with at least one steerable vehicle, at least one operating device for the vehicle and a data transfer device for the exchange of data and/or signals between the vehicle and the operating device. Preferably the vehicle is an aircraft, such as, for example, an armed missile.

2. Discussion of Background Information

If a vehicle that has an image acquisition device and transfers the acquired images to an operating unit on which an operator sees the displayed images is controlled by the operator based on these images, a significant latency occurs between the acquisition of an image in the vehicle and the arrival of a control signal due to an operator command carried out on the basis of the acquired and displayed image. This latency can mean that operator commands as a reaction of the operator to a recorded image arrive at the vehicle with marked delay, so that the control of the vehicle cannot be carried out successfully in this manner.

To solve this latency problem, it is known with a missile to provide a data transfer device with a broadband data link between the missile and the operating unit. The operator thereby receives the image sequence or video sequence recorded by the image acquisition device displayed on the image display device of the operating unit with an imperceptible time delay and thus can correct the target point, for example, during the flight of the missile. The image is transmitted to the operating unit of the ground station without almost any latency due to the rapid data connection. During the flight, the details of the target become visible to the operator with increasing clarity. Moreover, due to the fast data connection, the images can be transmitted at a high image refresh rate so that a video sequence is produced virtually free from jolts, which provides the operator with a good basis for a target correction. The data transfer is thereby carried out via an optical fiber cable, which is unwound from a reel in the missile during the flight. This optical fiber cable thus represents a physical connection between the flying missile and the operating unit. It is obvious that a physical connection of this type can be maintained only over a limited distance between the operating unit and the target point. An alternative to this physical data transfer connection by optical fiber cable or copper cable can be a broadband radio connection, which, however, can be realized only with direct sight connection between the operating unit and the missile and only over a relatively short distance. If a direct sight connection between the operating unit and the missile in flight is not possible and if cable cannot or should not be carried on board, the only possibility is a transfer at much lower data rates via radio.

So-called "man-in-the-loop" controls of this type, in which an operator operates the vehicle by remote control based on images recorded in the vehicle, have two considerable advantages. During the approach by the vehicle to a target or a target region, the operator can orient himself based on the transmitted images and reconnoiter the region regarding a target or alternative targets. To this end, the operator can pivot the image recording device of the vehicle via the remote control, for example, if the vehicle is underway for a sufficient length of time. Furthermore, the operator has the option of selecting the concrete target and carrying out corresponding path corrections. The closer the vehicle approaches the target or the target region, the more precisely the target can be identified. On the basis of this identification either a more precise orientation in the target direction can be made or the mission can be aborted.

If only a narrow-band data transfer connection is available instead of a broadband data transfer connection, the remote control of the vehicle by the operator will become markedly more difficult. Even a simple pivoting of the seeker head with the image acquisition device by the user, for example, carried out by a joystick on the operating unit, is virtually impossible for the operator to handle without additional precautions. The response of the movement of the control lever, that is, the entered operator command for the seeker head, arrives at the operating unit as a swivel visible in the image only after a long delay and long after the control lever has been actuated and is consequently displayed there on the image display device with a long delay. These latency periods or reaction times can be in the range of seconds even at high data compression rates. A target selection, that is, a control of the vehicle itself, cannot be carried out in this manner, either.

An alternative to this "man-in-the-loop" control affected by latency problems would be the use of tracking methods, i.e., an automatic tracking of the target in the image. However, tracking methods of this type require very sophisticated image processing devices on board the vehicle and substantially increase the cost of the vehicle.

SUMMARY OF THE INVENTION

Embodiments of the present invention are directed to a method for providing control commands for a vehicle steerable by an operating unit, in particular, a missile, or for an image acquisition device of the vehicle by a sequential display of image data of the image acquisition device of the vehicle on an image display device of the operating device connected to the vehicle via a data transfer connection. The method permits the reliable transmission of control commands to the vehicle while minimizing the effects of latency even with narrow-band data transfer connections.

Furthermore, embodiments are directed to a control system with at least one steearable vehicle, at least one operating device for the vehicle and a data transfer device for the exchange of data between the vehicle and the operating device, which, even with a narrow-band data transfer connection, renders possible a reliable remote control of the vehicle based on the images transferred to the operating device.

According to embodiments, a method according to the invention can include the following:

a) Acquisition of the data of an image recorded by the image acquisition device;

b) Acquisition of vehicle state data at the time the image was taken in step a);
c) Compression of the image data acquired in step a);
d) Transfer of the image data compressed in step c) together with the vehicle state data acquired in step b) via the data transfer connection to the operating unit;
e) Decompression of the transferred image data to form an image;
f) Display of the image obtained in step e) on the image display device;
g) Repetition of steps a) through f).

With the entry of an operator command into the operating unit, which causes a change of the direction of movement of the vehicle and/or a change in the direction of view of the image acquisition device, the following additional steps may also be carried out according to the invention:
h) From the last image obtained in step e) a new image is calculated by extrapolation of the previous image, taking into account the vehicle state data transferred in step d) and the operator command entered and
i) Displayed on the image display device instead of the image obtained in step e) and
j) A control command determined from the operator command is transferred to the vehicle via the data transfer connection.

Through the method according to embodiments of the invention, the image display device does not display to the operator the real images arriving with delay from the image acquisition device, but high-resolution hypothetical images that are produced based on a forecast. A hypothetical image of this type is based on a real recorded original image and is converted to a hypothetical image based on the known vehicle state data and the entered operator command. Consequently, an image is displayed which prospectively corresponds to the current view of the image acquisition device.

This so-called prediction method carried out in the operating unit of the ground station and the use of highly compressing image compression methods with low image refresh rates make it possible for the user to carry out a pivoting of the seeker head and/or a secure target selection as in real-time viewing of the scene recorded by the image acquisition device. In this manner, the latency that exists in reality has virtually no impact on the stability of the steering control circuit. Since no image processing methods are required on the vehicle apart from the data compression for image transfer, the method according to the invention leads to a very cost-effective method for the remote control of the vehicle. The prerequisite for this is only that navigation information is available on the vehicle.

A preferred further development of the method is characterized in that the vehicle state data contain the navigated position of the vehicle, the location at least of the longitudinal axis of the vehicle and its alignment as well as the target position to be targeted by the vehicle.

It is furthermore advantageous if the vehicle state data contain data on the direction of the optical axis of the image acquisition device and of the view direction thereof.

It is particularly advantageous thereby if the data of the direction of the optical axis, preferably as Eulerian angles, quaternions or transform matrixes are recorded and transferred. If an image acquisition device that is pivotable on the vehicle is available, it is advantageous to record and transfer the measured pivot angle (gimbal angle).

In a further preferred embodiment of the method according to the invention, the direction to the target position and/or the direction of the optical axis and/or the direction of the longitudinal axis of the vehicle is displayed in the image, preferably as cross hairs.

In a particularly preferred further development of the method according to embodiments of the invention, the extrapolation of the previous image with the entry of an operator command to change the viewing angle of the image acquisition device can include the following:
h1) Determining the direction of the optical axis of the image acquisition device from the vehicle state data transmitted in step d);
h2) Determining the commanded direction of the optical axis from the entered operator command;
h3) Determining a new image by changing the previous image taking into account the commanded direction of the optical axis;
h4) Transmitting the commanded direction of the optical axis acquired in step h2) to the vehicle;
h5) Calculating new commanded gimbal angles for the image acquisition device in the onboard computer of the vehicle using, the transmitted commanded direction of the optical axis and the navigated vehicle location and
h6) Pivoting the image acquisition device according to the commanded gimbal angles calculated in step h5).

Further, it can be particularly advantageous if the following steps are carried out to determine the new image in the above-described step h3):
h3.1) Estimating a new direction of the optical axis starting from the previous direction of the optical axis based on a model of the vehicle dynamics and the gimbal dynamics of the pivotable image acquisition device using the commanded direction of the optical axis;
h3.2) Transforming the image based on the new estimated direction of the optical axis.

Preferably, steps h1) through h6) as well as i) and j) and preferably the steps h3.1) and h3.2) are repeated continuously with changes in the operator command.

In the event of the entry of an operator command to change the direction of movement of the vehicle, the extrapolation of the previous image may preferably include the following:
k1) Determining the direction of the optical axis of the image acquisition device from the vehicle state data transmitted in step d);
k2) Determining the control command, that is, the commanded direction of movement or the commanded movement target from the entered operator command;
k3) Determining a new image by changing the previous image while taking into account the control command determined in step k2);
k4) Transferring the control command determined in step k2) to the vehicle;
k5) Calculating new vehicle control commands (for example, acceleration commands) in the onboard computer of the vehicle using the control commands determined in step k2) as well as the navigated vehicle data (such as, for example, vehicle position, vehicle location and direction of movement) and
k6) Carrying out the vehicle control command determined in step k5).

It can also be particularly advantageous if the following steps are carried out to determine the new image in the above-noted step k3):
k3.1) Estimating a new vehicle location and direction of movement starting from the previous vehicle location and direction of movement based on a model of the vehicle dynamics;

k3.2) Transforming the image based on the new estimated vehicle location and direction of movement.

Preferably, steps k1) through k6) as well as i) and j) and preferably steps k3.1) and k3.2) are continuously repeated with changes in the operator command.

It is also advantageous if the optical axis of the image acquisition device is adjusted in the direction of the target position.

Embodiments of the invention are also directed to a control system that includes at least one steearable vehicle, at least one operating unit for the vehicle and a data transfer device for the exchange of data and/or signals between the vehicle and the operating unit. The vehicle has at least one seeker head provided with an image acquisition device, an image signal processing device, a vehicle-side transmitter and receiver unit as well as a control device for the vehicle. The operating unit has an operating unit-side transmitter and receiver unit, a signal processing device, an image display device and a command entry device. A data compression device is assigned to the vehicle-side transmitter and receiver unit and a data compression device is assigned to the operating unit-side transmitter and receiver unit, and the signal processing device of the operating unit is embodied such that it transfers image data of consecutive images received by the image acquisition device of the vehicle to the image display device, wherein after the entry of an operator command to change the direction of movement of the vehicle and/or to change the direction of view of the image acquisition device into the operating unit, a new image is calculated by extrapolation of the last received and displayed image according to a method according to the invention according to one of the preceding claims taking into account vehicle state data and the entered operator command and is displayed on the image display device. The control command determined from the operator command is then transmitted to the vehicle by the data transfer device and converted in the vehicle.

A control system of this type, which operates according to the embodiments of the method, represents a cost-effective remote control of the vehicle by a human operator from an operating station having the operating device.

Preferably, the vehicle is an aircraft, such as, for example, an armed missile, which is remotely controlled from a ground station.

The advantages of remote control according to the "man-in-the-loop" method, listed above, are realized in this control system. Consequently, the operator can orient himself by pivoting the image acquisition device during the drive or during the flight. Furthermore, when approaching a target, the operator can carry out path corrections based on the image shown on the image display device or even abort a mission.

When the vehicle is armed, preferably is formed by an armed missile, the control system according to the invention forms a new type of weapon system.

Embodiments of the invention are directed to a method for providing control commands for a vehicle steerable by an operating unit or for an image acquisition device of the vehicle by sequential display of acquired image data on an image display device of the operating unit connected to the vehicle via a data transfer connection. The method includes acquiring data of an image recorded by the image acquisition device, acquiring vehicle state data at a time the image was recorded, and compressing the image data. The method also includes transferring the compressed image data and the vehicle state data via the data transfer connection to the operating unit, decompressing the transferred image data to form a displayable image, and displaying the displayable image on the image display device. The method further includes entering an operator command into the operating unit to at least one of change a direction of movement of the vehicle and change a direction of view of the image acquisition device, calculating a new image from the displayable image that takes into account the transferred vehicle state data and the entered operator command, displaying the new image on the image display device instead of the displayable image, and transferring a control command from the operator command to the vehicle via the data transfer connection.

According to embodiments of the instant invention, the acquiring of data of an image, the acquiring of vehicle state data, the compressing of the image data, the transferring of the compressed image data, the decompressing of the transferred image data, and the displaying of the displayable image on the image display device may be repeated.

In accordance with other embodiments, the new image can be calculated by extrapolation from a previous displayable image.

Moreover, the vehicle state data can, include data related to a navigated position of the vehicle, a location at least of the longitudinal axis of the vehicle and its alignment, and a target position to be targeted by the vehicle. Also, the vehicle state data may include data related to a direction of an optical axis of the image acquisition device. At least one of: a direction to the target position, the direction of the optical axis, and a direction of movement of the vehicle can be displayed in the image. Further, the at least one of: the direction to the target position, the direction of the optical axis, and the direction of movement of the vehicle may be displayed in the image as cross hairs.

According to further embodiments of the invention, when an operator command to change the viewing angle of the image acquisition device is entered, the extrapolation of the previous image can include determining the direction of the optical axis of the image acquisition device from the vehicle state data transmitted, determining the commanded direction of the optical axis from the entered operator command, determining a new image by changing the previous image taking into account the commanded direction of the optical axis, transmitting the commanded direction of the optical axis to the vehicle, calculating new commanded gimbal angles for the image acquisition device in the onboard computer of the vehicle using the transmitted commanded direction of the optical axis and the navigated vehicle location, and pivoting the image acquisition device according to the calculated new commanded gimbal angles. Further, the determining of the new image can include estimating a new direction of the optical axis starting from the previous direction of the optical axis based on a model of the vehicle dynamics and the gimbal dynamics of the pivotable image acquisition device using the commanded direction of the optical axis, and transforming the image based on the new estimated direction of the optical axis.

According to further embodiments, the determining the direction of the optical axis of the image acquisition device; the determining of the commanded direction of the optical axis; the determining of a new image; the transmitting of the commanded direction; calculating new commanded gimbal angles; the pivoting the image acquisition device; the displaying of the new image; and the transferring of a control command may be repeated continuously with changes in the operator command. Further, the estimating of a new direction of the optical axis; and the transforming of the image can also be repeated continuously with changes in the operator command.

In accordance with other embodiments of the invention, with the entry of an operator command to change the direction of movement of the vehicle, the extrapolation of the previous image may include determining the direction of the optical axis of the image acquisition device from the transmitted vehicle state data, determining the control command that is one of a commanded direction of movement or a commanded movement target from the entered operator command, determining a new image by changing the previous image while taking into account the control command, transferring the control command to the vehicle, calculating new vehicle control commands in the onboard computer of the vehicle using the control commands as well as the navigated vehicle data, and carrying out the calculated vehicle control command. Further, the determining of the new image may include estimating a new vehicle location and direction of movement starting from the previous vehicle location and direction of movement based on a model of the vehicle dynamics, and transforming the image based on the new estimated vehicle location and direction of movement.

According to further aspects of the method, the determining of the direction of the optical axis of the image acquisition device; the determining of the control command; the determining of a new image; the transferring of the control command to the vehicle; the calculating of new vehicle control commands in the onboard computer of the vehicle; the carrying out of the calculated vehicle control command; the displaying of the new image; and the transferring of a control command can be repeated continuously with changes in the operator command. Moreover, the estimating of a new vehicle location and direction of movement; and the transforming of the image can also be continuously repeated with changes in the operator command.

In accordance with still yet other embodiments of the present invention, the method can further include setting the direction of the optical axis of the image acquisition device in the direction of the target position.

Embodiments of the invention are directed to a control system that includes at least one steerable vehicle having at least one seeker head provided with an image acquisition device, an image signal processing device, a vehicle-side transmitter and receiver unit, and a control device for the vehicle. A data compression device is assigned to the vehicle-side transmitter and receiver unit. The control system also includes at least one operating unit for the vehicle having an operating unit-side transmitter and receiver unit, a signal processing device, an image display device and a command entry device, and a data compression device is assigned to the operating unit-side transmitter and receiver unit. A data transfer device is provided for the exchange of at least one of data and signals between the vehicle and the operating unit. The signal processing device of the operating unit is structured and arranged to transfer image data of consecutive images received by the image acquisition device of the vehicle to the image display device, the command entry device is structured and arranged to receive entry of an operator command to at least one of change a direction of movement of the vehicle and change a direction of view of the image acquisition device into the operating unit, and, in response to the received entry, a new image that is calculated by extrapolation of a last received and displayed image taking into account vehicle state data and the entered operator command is displayed on the image display device, and the operator side transmitter is structured and arranged to transmit a control command determined from the operator command to the vehicle side receiver via the data transfer device, and vehicle includes a converter to convert the received control command.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein FIG. 1 diagrammatically illustrates a control system according to the invention with the operational sequence of the method according to the invention during the pivoting of the image acquisition device using the example of a missile.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
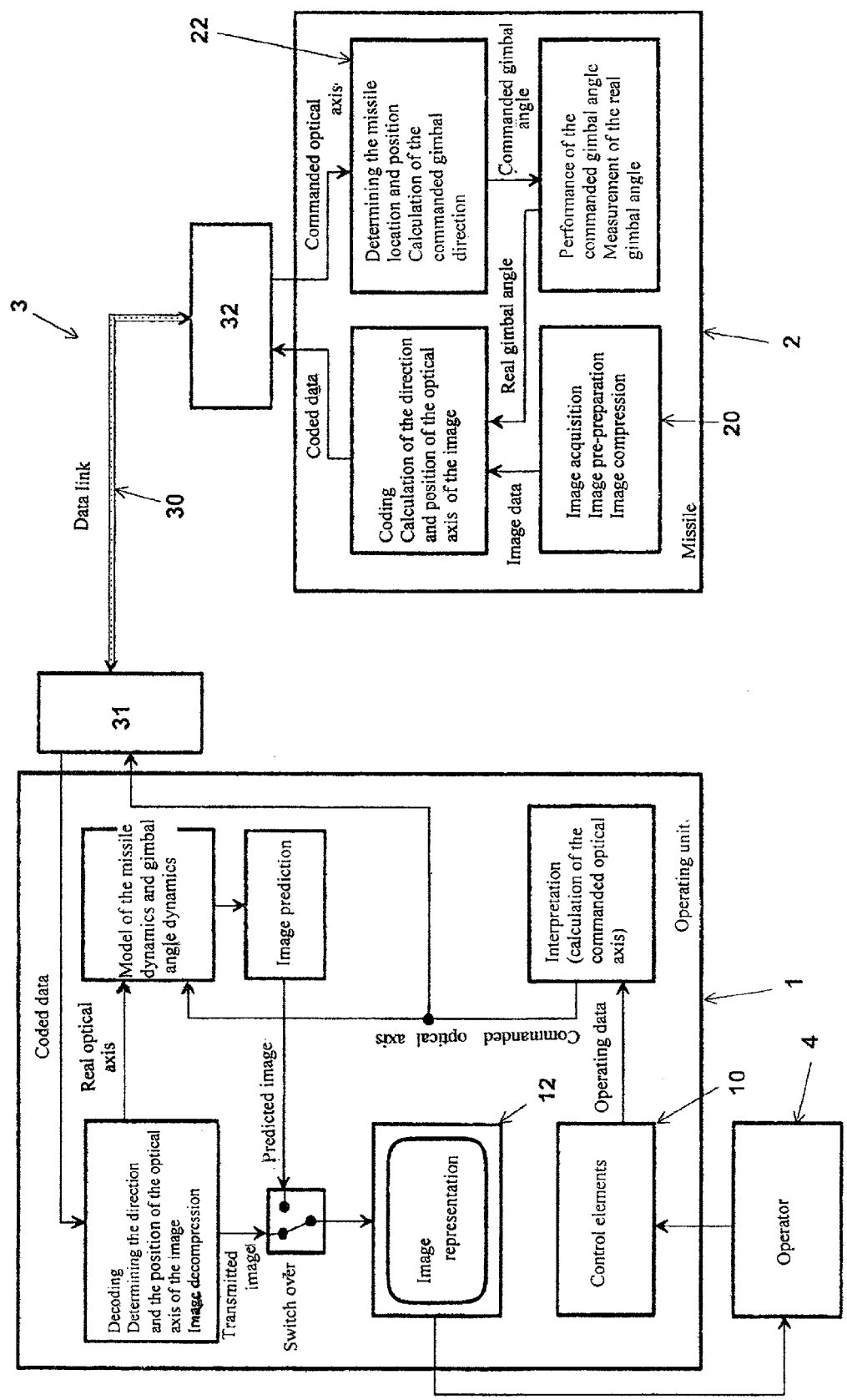

FIG. 1 shows a diagrammatic concept rendering of a control system according to the invention using the example of an armed missile. The control system includes a missile 2 and an operating unit 1 for the remote control of the missile 2. FIG. 1 shows the signal flow and the operational sequence that takes place with the entry of a pivot command for the image acquisition device according to the embodiments of the method.

The operating unit 1 is connected to the missile 2 via a data communication connection 3, referred to as a data link or also as a data transfer connection, for the reciprocal exchange of data and/or signals.

The data communication connection 3 comprises a first transmitter and receiver device 31 assigned to the operating unit 1, a second transmitter and receiver device 32 assigned to the missile 2 and a wireless transmission link 30 for the data and/or signals.

An operator designated as operator 4 operates the operating station 2, which contains, among other things, operating elements of a command entry device 10, e.g., an entry instrument (such as, a control stick or joystick) and to which an image display device 12 is assigned.

The missile 2 has an image acquisition device 20, which contains a recording sensor, e.g., a camera, for recording images, as well as a computer for image processing and for image data compression. The image acquisition device 20 or the camera thereof is arranged in a pivotable manner in the nose of the missile 2 in a known manner.

Furthermore, the missile 2 is provided with a navigation device, which is a constituent of a device 22 for determining missile state data. This device 22 for determining missile state data contains suitable sensors for determining at least the missile location and the flight direction, and can determine the current position of the missile via the navigation device. The missile 2 is furthermore provided with an onboard computer—not shown—which is able to perform calculations to control the missile and to control the image acquisition device.

The image acquisition device 20 of the missile 2 records an image. This image is processed either in the computer of the image acquisition device 20 or in the onboard computer and, if necessary optimized, e.g., by a contrast correction. Subsequently, the data of this processed image are compressed for the data transfer.

Parallel to recording the image, an acquisition of missile state data is carried out at the time the image is recorded. These missile state data comprise at least the navigated position of the missile 2 and its flight position and air traffic control, the target position and, with a pivotable recording sensor of the image acquisition device, also the gimbal angle measured on the pivot axes, i.e., the gradients of the optical axis of the recording sensor of the image acquisition device 20 relative to the missile-fixed axes. The information gained herefrom on the direction and the position of the optical axis of the image recorded is encrypted together with the compressed image data and transmitted as an encoded data stream from the second transmitter/receiver device 32 via the wireless transmission link 30 to the first transmitter/receiver device 31 and from there to the operating station 1.

In the operating station 1, the arriving encoded data are first decoded and the direction and the position of the optical axis of the image are determined. The image data contained in the data received are subsequently decompressed and shown to the operator 4 on the image display device 12. Preferably, additional information is inserted into the image shown such as, for example, the direction of the optical axis in the form of cross hairs. The operability and thus the controllability of the missile or the pivotable image acquisition device 20 are facilitated thereby.

When the operator 4 actuates the joystick of the operating elements 10 for the purpose of pivoting the image acquisition device 20 or the recording sensor of the image acquisition device, the processes described below take place in the operating unit.

First the image transmitted from the missile is shown on the image display device 12 of the operating unit 1. The direction of the optical axis of the transmitted image is determined from the missile state data received. Due to the latency in the data transfer from the missile 2 via the data transfer connection 3 to the operating unit 1, the image shown and the determined optical axis do not correspond to the real-time state, but to a state in the past.

If the operator 4 now gives a command via the joystick to pivot the optical axis of the image acquisition device or the recording sensor thereof, it would again take a long time until the image resulting from the pivot motion is displayed on the image display device. This latency leads to a high time lag in the control loop between the operator 4, the control and the movement of the image acquisition device 20.

To compensate for this latency, on the basis of the operating data entered via the joystick of the operating elements 10, the operating unit determines the direction of the commanded optical axis and the difference from the optical axis of the image currently shown by the image display device 12. A model of the missile dynamics and the gimbal dynamics, i.e., the dynamics of the swivel motions of the image acquisition device or the recording sensor thereof, is implemented in the operating unit 1. Based on this movement model, on the basis of the real optical axis of the displayed image and the calculated commanded optical axis, the optical axis at the current time is estimated in a computer of the operating unit and the most current image received from the missile 2 is transformed according to this estimated real optical axis. This so-called image prediction provides a predicted (estimated) image which is then displayed by the image display device 12 instead of the last transmitted image.

In the simplest case, this image prediction can be carried out by displacing and if necessary scaling the last image received. The image parts missing thereby which were not visible in the original image are supplemented in a suitable manner, e.g., by single-color bars or by a grid structure, as is shown in the exemplary representation of FIGS. 2A and 2B.

Figure 2A:
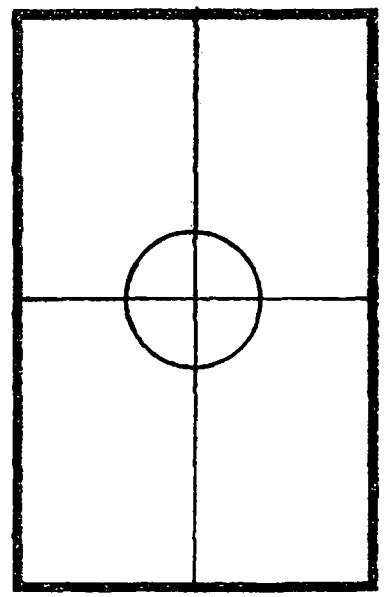
FIGS. 2A and 2B illustrates an image prediction produced by the method according to the invention.
Figure 2B:
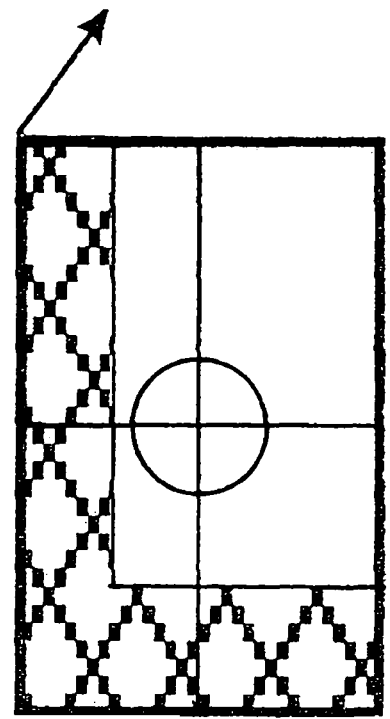

FIG. 2A shows a received image and FIG. 2B shows a predicted image, which has been produced by displacing the received image downwards to the right. The region of the predicted image for which no real image information is available, was replaced by a grid structure in the representation of FIG. 2B.

The retrieval of new operating commands and the prediction representation of the respectively predicted image are constantly repeated. Thus, the operator receives a direct optical feedback on his user interventions, that is, on his operator commands entered via the operating elements 10. Control commands in the form of the data for the commanded optical axis are determined from these operator commands or operating commands and transmitted via the data transfer connection 3 to the missile 2.

The missile first determines its own missile location and missile position by its navigation device and calculates from this navigated missile location and from the received commanded optical axis the new commanded gimbal angles for the pivotable image acquisition device 20 or for the pivotable recording sensor thereof. Subsequently, a pivoting of the image acquisition device 20 or of the recording sensor thereof is carried out on the basis of these new commanded gimbal angles.

The essential factor of this principle according to the invention is the asynchronous realization which mitigates the latency problem. As soon as a new transmitted image is available, it replaces the predicted image. Since the newly received image is similar to the previously displayed predicted image, the optically discernible image jump will be slight and the operator is not impeded in his operating activity. Ideally, only the image parts missing in the predicted image are then replaced. Analogously, a new image can be recorded in the missile, even while the last operator command has not yet been completely transmitted to the missile and realized there. To this end, it is necessary to always transmit with the image the measured gimbal angle (i.e., the gimbal angle present at the moment the image was recorded) or, using the navigated missile location, the current direction of the optical axis calculated therefrom.

Figure 3:
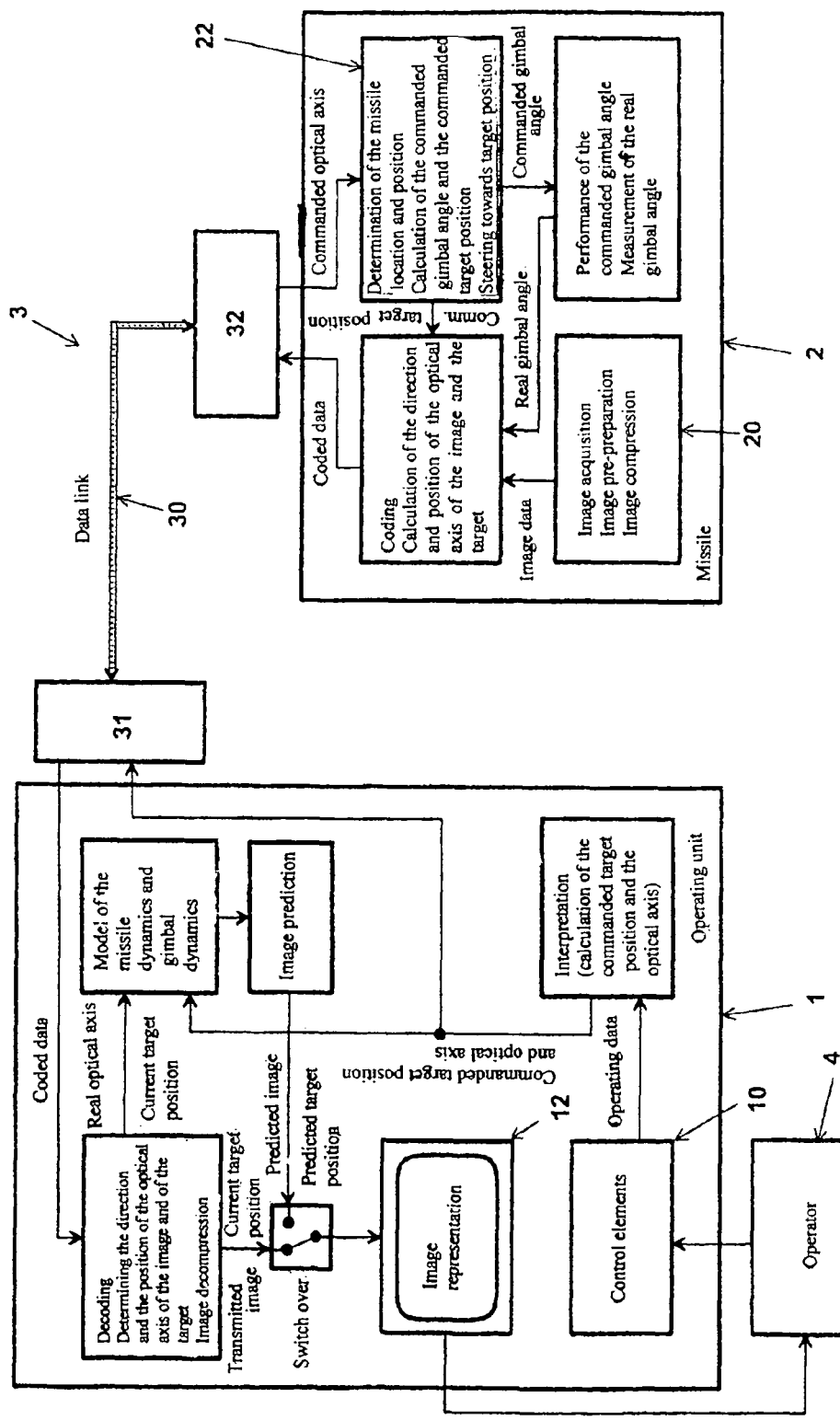
FIG. 3 diagrammatically illustrates a control system according to the invention with the operational sequence of the method according to the invention with a change of the path of the vehicle using the example of a missile.

Based on FIG. 3, an example is given below in which the operator commands entered by the operator 4 via the operating elements 10 are used to change the flight path, when the missile is to approach a new target, for example, or when the flight direction to the target is to be changed. The procedure and the sequence are essentially the same as with the pivoting of the optical axis of the image acquisition device 20, as has been described in connection with FIG. 1.

Here, too, there can be a marked latency between the image transmitted and displayed by the image display device 12 and the target information available in the missile at the time of display.

In addition to the data of the optical axis of the recording sensor or the image acquisition device 20, with this form of the realization of the method according to the invention, the commanded direction to the target determined by the operator command, which the operator 4 enters into the operating unit 1 via the operating elements 10, is transmitted. The direction of the optical axis and the direction to the target are displayed, e.g., as cross hairs on the display device 12 of the operating unit 1. The operator 4 can influence both directions by the operating elements 10. If the target is not located in the direction of the optical axis, that is, not in the center of the image, the target position will jump from image to image and ultimately shift out of the image. This makes the correction of the target position by the operator much more difficult. It is therefore expedient during the final approach to regulate the optical axis of the seeker head in the direction of the planned target position.

The operator command for the target position entered by the user 4 via the operating elements 10 is first used in the operating unit 1 for calculating a commanded target position. This commanded target position together with the current target position received from the missile 2 is then subjected to the image prediction calculation on the basis of the model of the missile dynamics and the gimbal dynamics. The predicted image obtained is then shown on the image display device 12, as in the example of FIG. 1. At the same time, the data of the commanded target position, i.e., the commanded direction from the missile 2 to the target, are transmitted via the data transfer connection 3 to the missile 2. There the commanded target position is calculated in the device 22 to determine missile state data based on the transmitted commanded direction from the missile to the target position and used to calculate the position of the target in the recorded image. These image data containing the position of the target are then transmitted to the operating unit as in the example of FIG. 1.

Figure 4B:
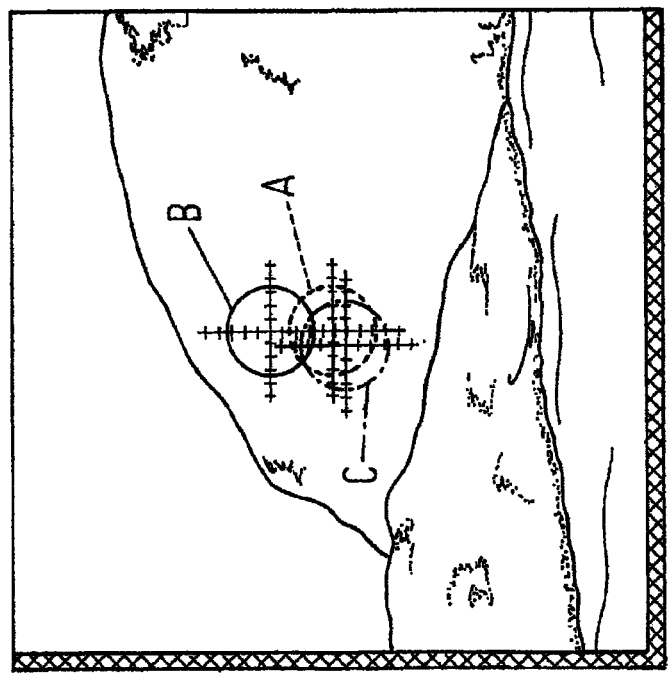
FIGS. 4A and 4B illustrate an image display before and after a pivot command has been issued.
Figure 4A:
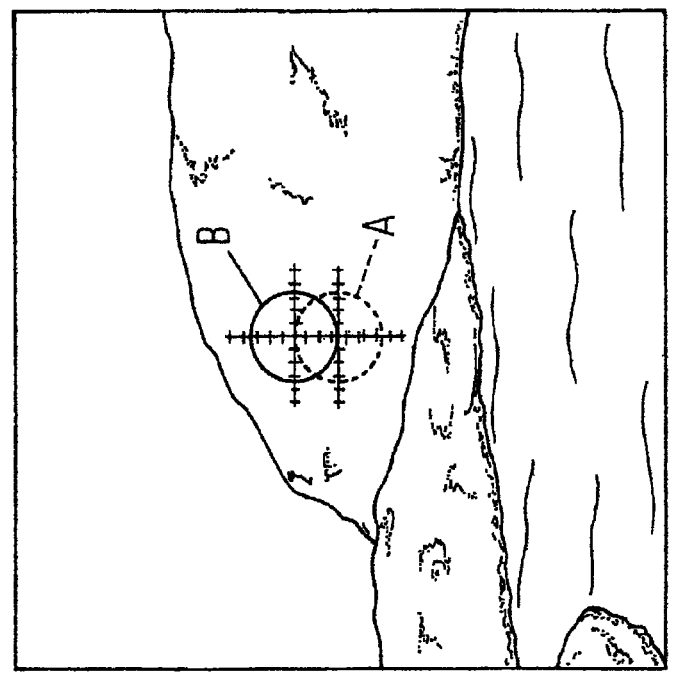

FIGS. 4A and 4B show a prediction of the representation of a changing target position on the basis of a real image (FIG. 4A) recorded by the image acquisition device 20 of the missile 2 and a predicted image (FIG. 4B).

In FIG. 4A, the direction of the optical axis of the image acquisition device 20 (center of the image) is marked by first cross hairs A and the flight direction of the missile, which corresponds to the velocity vector of the missile, is marked by second cross hairs B. The optical axis of the image acquisition device 20 is directed at the target to be approached and, in this example, consequently corresponds to the target vector directed from the missile 2 to the target. The velocity vector of the missile (cross hairs B) deviates during the flight due to the selected flight path (for example, a ballistic path) from the optical axis or the target vector. Towards the end of the flight, the cross hairs B will also move into the center of the image.

FIG. 4B furthermore shows by third cross hairs C the direction to a new target aimed at by the operator and selected via the actuation of the operating unit. In the case of the missile simulated here, the seeker head equipped with the image acquisition device 20 (and with it ultimately the entire missile) pivots in the direction of the new target aimed at.

If the image is pivoted for a new target instruction (FIG. 4B), the cross hairs A, which represented the previous optical axis and therefore in FIG. 4A are congruent with the cross hairs C, shift from the center of the image of the predicted image. After some time, the seeker head will actually carry out the pre-simulated swivel motion and the associated cross hairs A will again move into the center of the image.

Ideally, (FIG. 4A) cross hairs A and cross hairs C are therefore congruent and towards the end of the flight cross hairs B will also move into the center of the image.

Even though the invention has been described based on a missile as a vehicle in the exemplary embodiments, the method according to the invention and the control device according to the invention can also be realized with other vehicles, such as, for example, ground vehicles, watercraft or spacecraft.

Reference numbers in the claims, the specification and the drawings are used only for the better understanding of the invention and are not intended to restrict the scope of protection.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMBERS

1 Operating unit
2 Missile (vehicle)
3 Data transfer connection
4 Operating person or operator
10 Command entry device
12 Image display device
20 Image acquisition device
22 Device for determining missile state data
30 Transmission link
31 First transmitter and receiver device
32 Second transmitter and receiver device

What is claimed:

1. A method for providing control commands for a vehicle steerable by an operating unit or for an image acquisition device of the vehicle by sequential display of acquired image data on an image display device of the operating unit connected to the vehicle via a data transfer connection, the method comprising:

acquiring data of an image recorded by the image acquisition device;

acquiring vehicle state data at a time the image was recorded;

compressing the image data;

transferring the compressed image data and the vehicle state data via the data transfer connection to the operating unit;

decompressing the transferred image data to form a displayable image;

displaying the displayable image on the image display device;

entering an operator command into the operating unit to at least one of change a direction of movement of the vehicle and change a direction of view of the image acquisition device, calculating a new image from the displayable image that takes into account the transferred vehicle state data and the entered operator command;

displaying the new image on the image display device instead of the displayable image; and transferring a control command from the operator command to the vehicle via the data transfer connection.

2. The method in accordance with claim 1, wherein the acquiring of data of an image, the acquiring of vehicle state data, the compressing of the image data, the transferring of the compressed image data, the decompressing of the transferred image data, and the displaying of the displayable image on the image display device are repeated.

3. The method in accordance with claim 1, wherein the new image is calculated by extrapolation from a previous displayable image.

4. The method in accordance with claim 3, wherein, when an operator command to change the viewing angle of the image acquisition device is entered, the extrapolation of the previous image comprises:

determining the direction of the optical axis of the image acquisition device from the vehicle state data transmitted;

determining the commanded direction of the optical axis from the entered operator command;

determining a new image by changing the previous image taking into account the commanded direction of the optical axis;

transmitting the commanded direction of the optical axis to the vehicle;

calculating new commanded gimbal angles for the image acquisition device in the onboard computer of the vehicle using the transmitted commanded direction of the optical axis and the navigated vehicle location; and pivoting the image acquisition device according to the calculated new commanded gimbal angles.

5. The method in accordance with claim 4, wherein the determining of the new image comprises:

estimating a new direction of the optical axis starting from the previous direction of the optical axis based on a model of the vehicle dynamics and the gimbal dynamics of the pivotable image acquisition device using the commanded direction of the optical axis; and transforming the image based on the new estimated direction of the optical axis.

6. The method in accordance with claim 4, wherein the determining the direction of the optical axis of the image acquisition device; the determining of the commanded direction of the optical axis; the determining of a new image; the transmitting of the commanded direction; calculating new commanded gimbal angles; the pivoting the image acquisition device; the displaying of the new image; and the transferring of a control command are repeated continuously with changes in the operator command.

7. The method in accordance with claim 6, wherein the estimating of a new direction of the optical axis; and the transforming of the image are repeated continuously with changes in the operator command.

8. The method in accordance with claim 1, wherein the vehicle state data comprise data related to a navigated position of the vehicle, a location at least of the longitudinal axis of the vehicle and its alignment, and a target position to be targeted by the vehicle.

9. The method in accordance with claim 8, wherein the vehicle state data comprise data related to a direction of an optical axis of the image acquisition device.

10. The method in accordance with claim 9, wherein at least one of a direction to the target position, the direction of the optical axis, and a direction of movement of the vehicle is displayed in the image.

11. The method in accordance with claim 10, wherein the at least one of the direction to the target position, the direction of the optical axis, and the direction of movement of the vehicle is displayed in the image as cross hairs.

12. The method in accordance with claim 1, wherein, with the entry of an operator command to change the direction of movement of the vehicle, the extrapolation of the previous image comprises:

determining the direction of the optical axis of the image acquisition device from the transmitted vehicle state data;

determining the control command that is one of a commanded direction of movement or a commanded movement target from the entered operator command;

determining a new image by changing the previous image while taking into account the control command;

transferring the control command to the vehicle;

calculating new vehicle control commands in the onboard computer of the vehicle using the control commands as well as the navigated vehicle data; and carrying out the calculated vehicle control command.

13. The method in accordance with claim 12, wherein the determining of the new image comprises:

estimating a new vehicle location and direction of movement starting from the previous vehicle location and direction of movement based on a model of the vehicle dynamics; and transforming the image based on the new estimated vehicle location and direction of movement.

14. The method in accordance with claim 12, wherein the determining of the direction of the optical axis of the image acquisition device; the determining of the control command; the determining of a new image; the transferring of the control command to the vehicle; the calculating of new vehicle control commands in the onboard computer of the vehicle; the carrying out of the calculated vehicle control command; the displaying of the new image; and the transferring of a control command are repeated continuously with changes in the operator command.

15. The method in accordance with claim 14, wherein the estimating of a new vehicle location and direction of movement; and the transforming of the image are continuously repeated with changes in the operator command.

16. The method in accordance with claim 1, further comprising setting the direction of the optical axis of the image acquisition device in the direction of the target position.

17. A control system comprising:

at least one steerable vehicle having at least one seeker head provided with an image acquisition device, an image signal processing device, a vehicle-side transmitter and receiver unit, and a control device for the vehicle, wherein a data compression device is assigned to the vehicle-side transmitter and receiver unit;

at least one operating unit for the vehicle having an operating unit-side transmitter and receiver unit, a signal processing device, an image display device and a command entry device, wherein a data compression device is assigned to the operating unit-side transmitter and receiver unit; and a data transfer device for the exchange of at least one of data and signals between the vehicle and the operating unit, wherein the signal processing device of the operating unit is structured and arranged to transfer image data of consecutive images received by the image acquisition device of the vehicle to the image display device, wherein the command entry device is structured and arranged to receive entry of an operator command to at least one of change a direction of movement of the vehicle and change a direction of view of the image acquisition device into the operating unit, and, in response to the received entry, a new image that is calculated by extrapolation of a last received and displayed image taking into account vehicle state data and the entered operator command is displayed on the image display device, and wherein the operator side transmitter is structured and arranged to transmit a control command determined from the operator command to the vehicle side receiver via the data transfer device, and vehicle includes a converter to convert the received control command.

* * * * *